(12) United States Patent
Marcus et al.

(10) Patent No.: US 8,500,010 B1
(45) Date of Patent: Aug. 6, 2013

(54) CARD READER FOR MOBILE DEVICE

(75) Inventors: David A. Marcus, Atherton, CA (US);
Hill Ferguson, San Francisco, CA (US);
Max E. Metral, Brookline, MA (US);
Egan Schulz, San Jose, CA (US)

(73) Assignee: Ebay Inc., San Jose, CA (US)

( * ) Notice: Subject to any disclaimer, the term of this patent is extended or adjusted under 35 U.S.C. 154(b) by 0 days.

(21) Appl. No.: 13/421,502

(22) Filed: Mar. 15, 2012

(51) Int. Cl.
*G06K 5/00* (2006.01)

(52) U.S. Cl.
USPC ............................. 235/380; 235/449; 235/493

(58) Field of Classification Search
USPC .......................................... 235/380, 449, 493
See application file for complete search history.

(56) References Cited

U.S. PATENT DOCUMENTS

2011/0084140 A1* 4/2011 Wen ................................ 235/449
2012/0052910 A1* 3/2012 Mu et al. ........................ 455/558

* cited by examiner

*Primary Examiner* — Kristy A Haupt
(74) *Attorney, Agent, or Firm* — Haynes and Boone, LLP

(57) ABSTRACT

A card reader for use with a mobile device includes a rotatable face that can be rotated over a portion of the mobile device so that when the user slides a card through the card reader, the overlapping portion of the rotatable face prevents the card reader from spinning or rotating. A foot and/or a housing for a jack on the bottom of the card reader prevents the card reader from accidently turning off the mobile device during use.

20 Claims, 5 Drawing Sheets

US 8,500,010 B1

CARD READER FOR MOBILE DEVICE

BACKGROUND

1. Field of the Invention

The present invention is related generally card readers and in particular to card readers for mobile devices.

2. Description of Related Art

Card readers, such as ones used to read credit cards, debit cards, and other types of cards, enable information to be quickly and easily communicated for processing. The information can be virtually anything that can be stored in a magnetic strip on the card. Cards with magnetic strips include room keys, driver licenses, reward cards, and, most commonly, payment or funding instrument cards, such as credit cards and debit cards.

Payment card readers enable a user to make a payment at a point of sale by simply swiping the card in the reader so that the magnetic strip is read by the reader, typically having the strip come in contact with a metal head in the reader. Information contained in the strip, such as card number, card holder name, etc., is electronically communicated to a payment processor, who can process the information and effect payment on behalf of the user to a payee, such as a merchant.

However, payment card readers are typically affixed to a merchant point of sale, such as at a checkout register or station. This restricts the uses of the payment card reader. Recently, Square has introduced a card reader for mobile devices to allow users to accept and make payments through their mobile devices. The Square card reader plugs into the audio port of an IOS device or other smart phone, so that a card can be swiped through the reader and the information communicated to the phone, which can then communicate the information to a payment processor.

Although the Square card reader now enables mobile devices to process card payments, it can be inconvenient to use, as the user needs to smoothly slide the card through the reader. Because the reader is simply plugged into a port, the reader can rotate when the card is slid through. This may require the user to hold the reader steady, while sliding the card. Since the reader is rotatable in the mobile device, the user may be required to hold both the mobile device and the reader at the same time. By simply holding the reader, the reader may be prone to disengage from the mobile device.

Therefore, there is a need for a card reader on a mobile device that overcomes the disadvantages of conventional mobile card readers discussed above.

SUMMARY

According to one embodiment of the present invention, a magnetic strip card reader for a mobile device has a face plate that can be rotated when the reader is inserted into the mobile device such that the face plate extends over at least a portion of a front or rear face of the mobile device. Thus, when the card is slid through the reader, the rotatable reader face plate abuts against the mobile device face to prevent the card reader from rotating.

In one embodiment, the rotatable reader face plate is on the front of the reader so that the face plate can be rotated over the front of the mobile device and the card is swiped through the reader with the magnetic strip facing away from the front of the reader.

In other embodiments, the rotatable face plate is smaller in area than the card reader so that the user can more easily rotate the plate. A protrusion or foot along the bottom portion of the card reader may prevent the card reader from pressing against an on/off button of the mobile device. The card reader may also, or in the alternative, have a cylindrical protrusion on a bottom portion of the reader, where an output jack that is inserted into the device port extends from the cylindrical protrusion. The cylindrical protrusion may also prevent the reader from being inserted too far into the mobile device so that the reader does not accidentally turn off the mobile device by pressing against its on/off button.

As a result, a user can quickly and easily slide a card through the card reader without having to worry about the card reader rotating while the card is being slid.

These and other features and advantages of the present invention will be more readily apparent from the detailed description of the embodiments set forth below taken in conjunction with the accompanying drawings.

Figure 1:
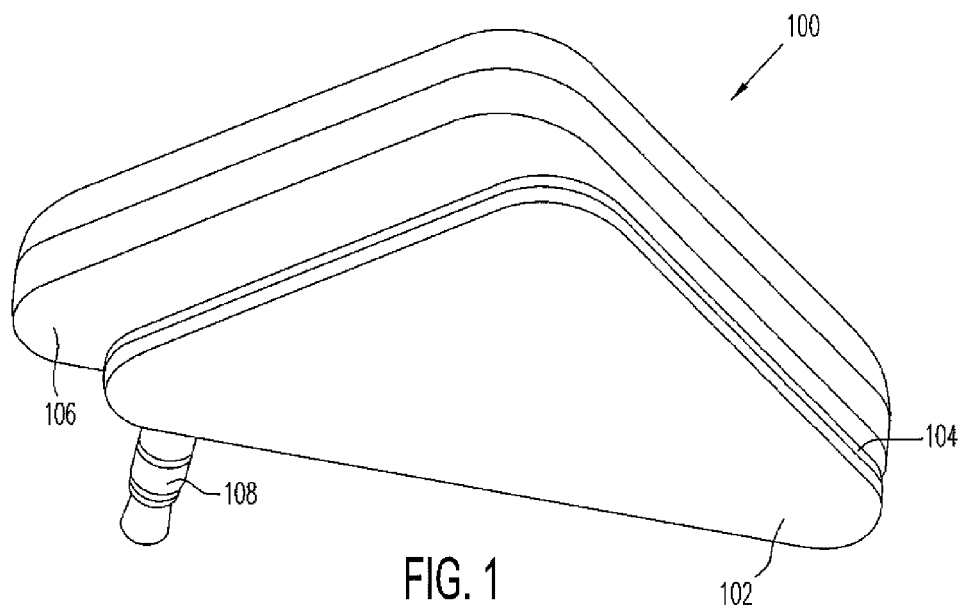
FIG. 1 is a top perspective view of a mobile card reader according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a top perspective view of a card reader 100 for use with a mobile device, such as a smart phone, computing tablet, or the like according to one embodiment. The shape of card reader 100 is triangular in this embodiment, although other shapes may also be suitable, such as square, rectangular, oval, etc. One advantage of a triangular shape is the conservation of material. The base of card reader 100 needs to be long enough to adequately slide and read the magnetic strip card, but that same length need not extend beyond the base or bottom portion. Card reader 100 includes a rotatable front face plate 102, a stationary front face plate 104, a stationary back plate 106, and an output plug or jack 108. Output jack 108 inserts into a port, such as an audio input port of a smart phone, of the mobile device to enable communication from the card reader to the mobile device. As seen from FIG. 1, both rotatable front face plate 102 and stationary front face plate 104 are the same size and smaller in area than back plate 106. However, size dimensions and relative sizes may be suitable, such as rotatable front face plate 102 being smaller in size than stationary front face plate 104. Rotatable front face plate 102 is separated from stationary front face plate 104 by the dotted line.

Figure 2:
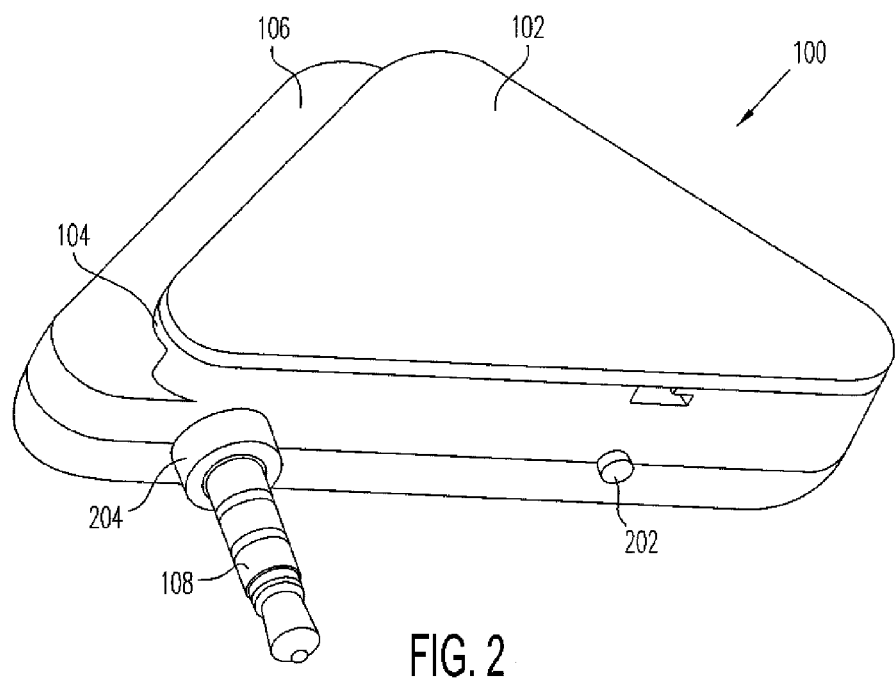
FIG. 2 is a bottom perspective view of the card reader of FIG. 1.

FIG. 2 is a bottom perspective view of card reader 100, which shows a protrusion or foot 202 extending from a bottom portion of card reader 100 according to one embodiment. Foot 202 can be located on any suitable bottom portion and should be tall enough so that when card reader 100 is inserted into a mobile device, the bottom surface of card reader 100 does not press an on/off button on the mobile device. In one embodiment, the height of foot 202 is greater than the height of the highest on/off button on a compatible mobile device. This will then allow the reader to be used on all compatible devices so that foot 202 prevents the reader from pressing the on/off button on all compatible devices. Foot 202 should be placed on card reader 100 so that foot 202 does not overlap the on/off button of all compatible mobile devices.

Card reader of FIG. 2 also has a cylindrical housing 204 from which output jack 108 extends. Cylindrical housing 204 may have a same or similar function as foot 202, i.e., preventing the bottom of card reader 100 from pressing an on/off button on the mobile device when output jack 108 is inserted into the mobile device. Note that housing 204 need not be cylindrical and can be other shapes as desired. The height of housing 204 can be determined based on the same or similar considerations as to the height of foot 202 discussed above, with a limitation that the height of housing 204 should be greater than the height of foot 202. If that is not the case (i.e., the height of foot 202 is greater), output jack 108 may not be able to be fully engaged with a port of the mobile device. In different embodiments, both housing 204 and foot 202 are present, only foot 202 is present, or only housing 204 is present. One advantage of having both housing 204 and foot 202 present is that the foot 202 may prevent card reader 100 from being pressed downward at an angle to press the on/off button even with housing 204 present on one side of the card reader.

Figure 3:
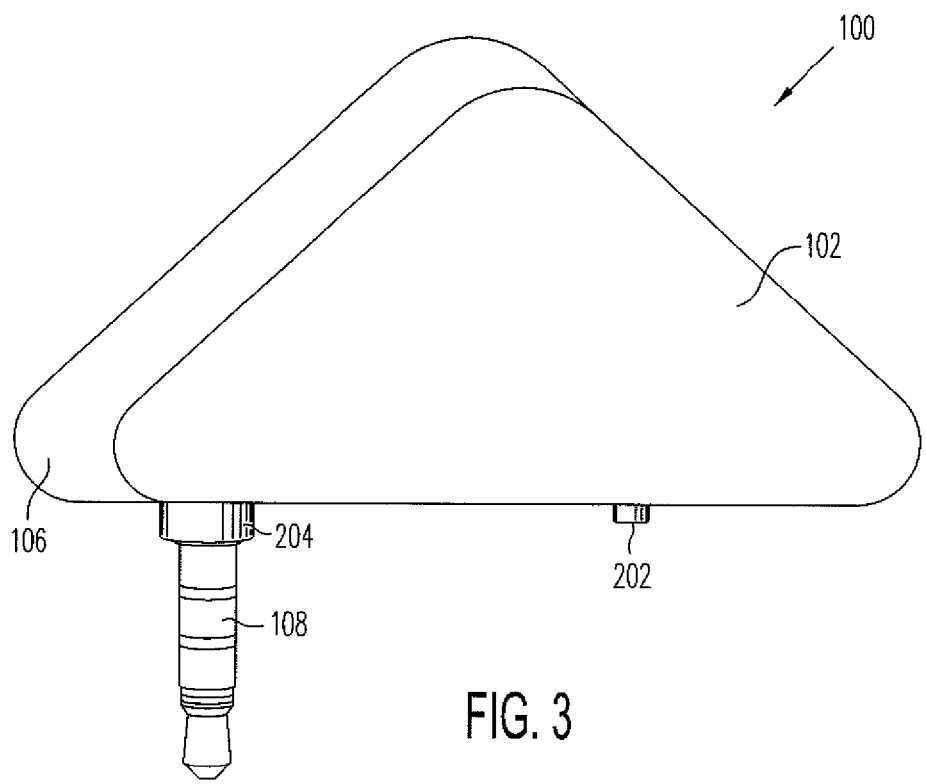
FIG. 3 is a front view of the card reader of FIG. 1.
Figure 5:
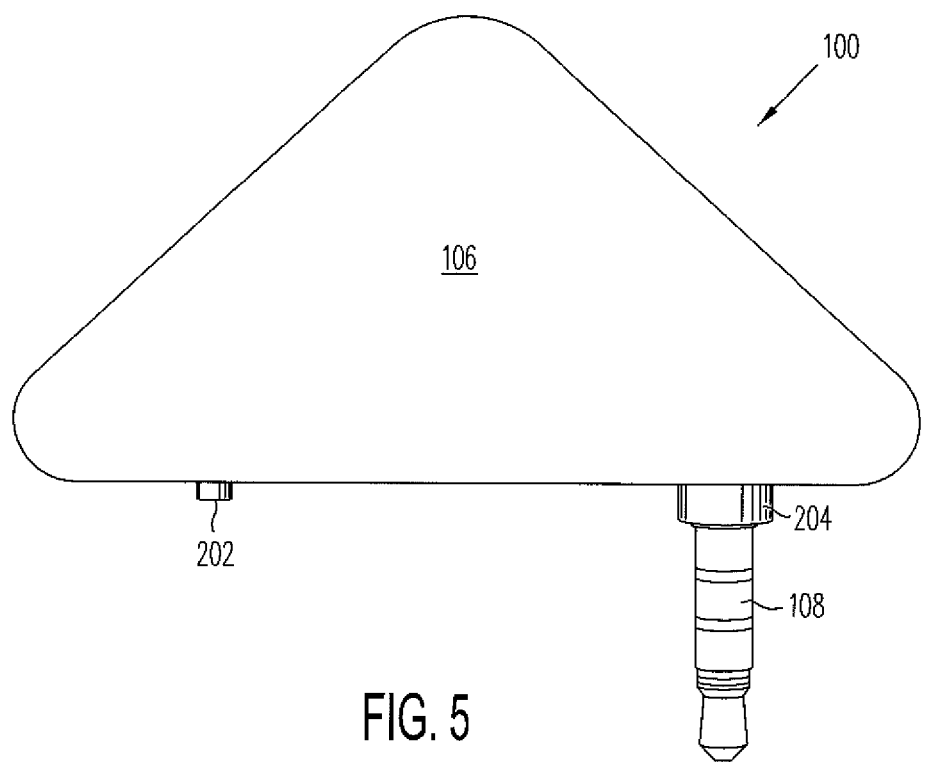
FIG. 5 is a back view of the card reader of FIG. 1.

FIG. 3 is a front view of card reader 100, which shows rotatable front face plate 102 covering the stationary front face plate. FIG. 5 is a back view of card reader 100. In this embodiment, both front face plates are the same size and align with each other. Both front face plates are offset from stationary back plate 106, which can make it easier for the user to slide a card through reader 100 and for the user to rotate front face plate 102.

Figure 4:
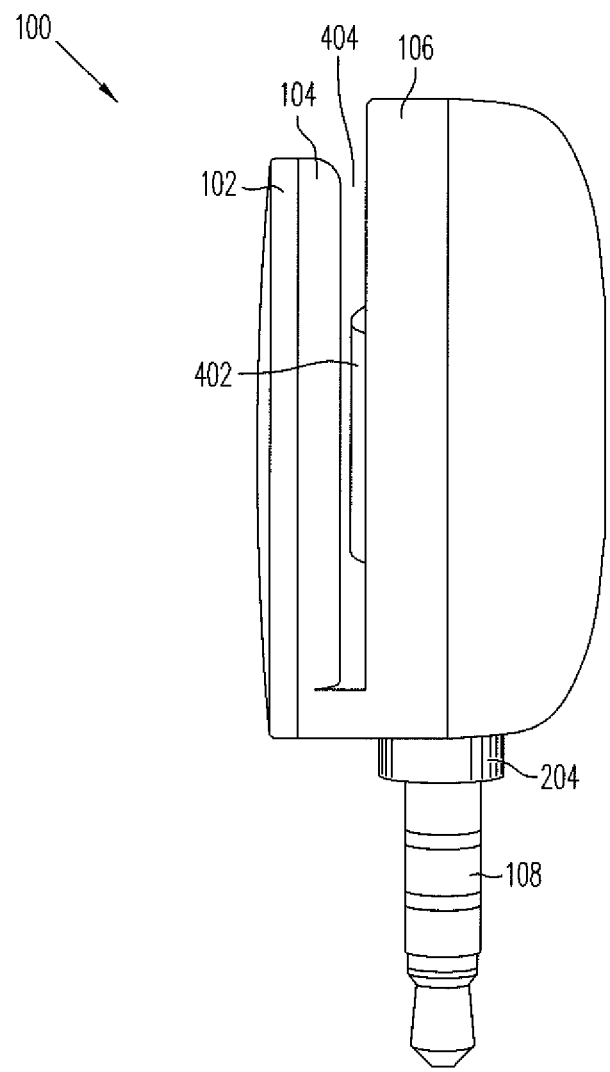
FIG. 4 is a side view of the card reader of FIG. 1.

FIG. 4 is a side view of card reader 100 showing a magnetic strip head or reader 402 within a slot 404. Slot 404 is between stationary back plate 106 and stationary front face 104. A magnetic strip card can be inserted into slot 404 and slid across head 402 such that the magnetic strip comes in contact with head 402. To ensure a proper reading of the card, the card typically has to be moved smoothly through the reader with sufficient contact to head 402. Rotatable front face plate 102 can be rotated downward so that at least a portion of the inner surface of plate 102 extends over at least a portion of a front or back surface of the mobile device. This prevents reader 100 from rotating if the user is pressing the card against head 402 during a swipe.

Figure 6:
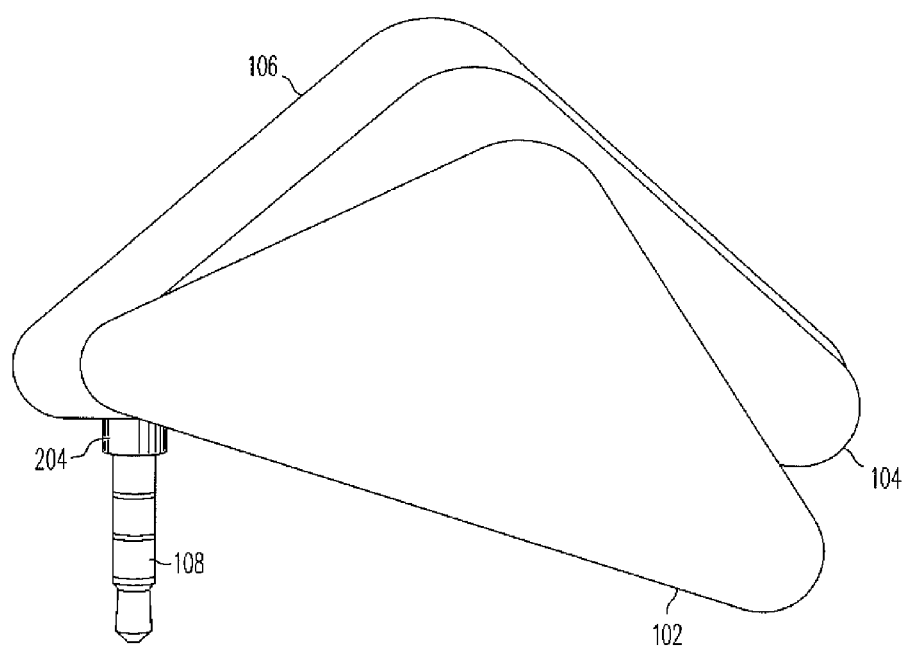
FIG. 6 is a front view of the card reader of FIG. 1, showing the front face plate rotated.

FIG. 6 is a front view of card reader 100, where rotatable front face plate 102 is rotated downward so that front face plate 102 no longer coincides with stationary front face plate 104. The portion now extending below the bottom surface of reader 100 would now overlap a portion of a front or back surface of the mobile device. Thus, if reader 100 is pushed backward, such as through the user swiping a card against stationary back plate 106, the extended lower portion of rotatable front face plate 102 can engage with the mobile device surface to prevent card reader 100 from rotating or spinning about plug 108.

Figure 7:
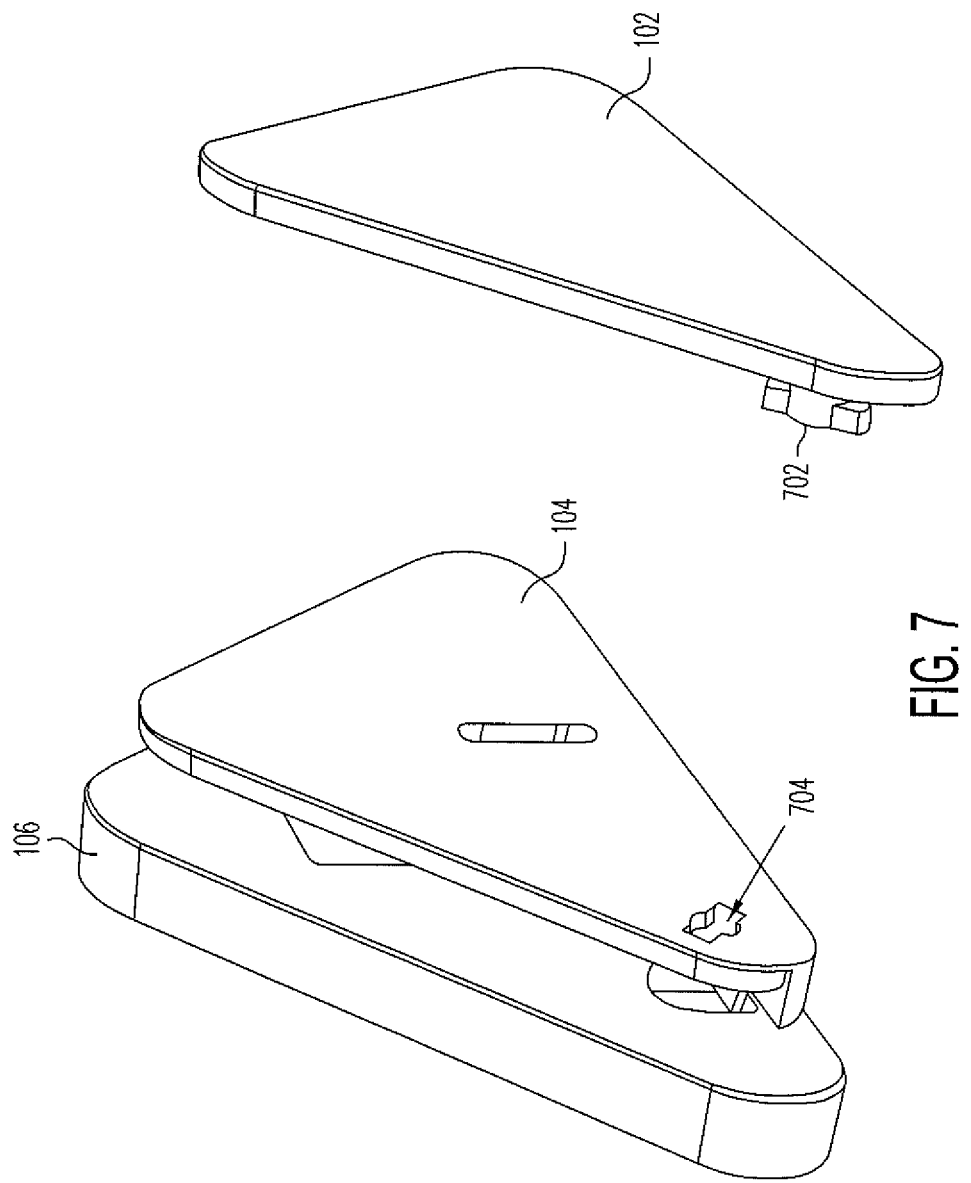
FIG. 7 is an exploded view of a portion of the card reader of FIG. 1.

FIG. 7 is an exploded view of a portion of card reader 100. In this view, only rotatable front face plate 102, stationary front face plate 104, and stationary back plate 106 are shown. Rotatable front face plate 102 includes a protrusion 702 that fits into a recess 704 in stationary front face plate 104. This allows rotatable front face plate 102 to rotate, while still being secured to stationary front face plate 104. Other ways to allow plate 102 to be secured to plate 104 and to rotate may also be suitable. In one embodiment, stationary front face plate 104 and stationary back plate 106 form a unitary structure made of plastic or other suitable material.

The size of reader 100 can vary, with a minimum length dependent on what would be needed to be able to properly read a magnetic strip card. A typical size should be less than or equal to the width of a standard smart phone; however, larger sizes may also be suitable. Smaller sizes may be desirable, since the user would have to carry the reader to use with the mobile device.

Thus, embodiments of the mobile card reader described herein enable a user to quickly and easily read a magnetic strip card using a mobile device without the card reader accidentally turning off the device or rotating/spinning while attempting to read the card.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A card reader comprising:
    a stationary back plate;
    a stationary front plate connected to the back plate, wherein a slot is formed between the back plate and the stationary front plate and wherein the slot is configured to receive a card; and
    a rotatable front plate rotatably coupled to the stationary front plate and rotatable along a face of the stationary front plate parallel to a front or back face of a mobile device, wherein the rotatable front plate is rotatable to be positioned such that at least a portion of the rotatable front plate overlaps a surface of the mobile device when the card reader is inserted into the mobile device.

2. The card reader of claim 1, wherein the stationary back plate, the stationary front plate, and the rotatable front plate are triangular.

3. The card reader of claim 2, wherein the stationary back plate is a larger triangle than the stationary front plate and the rotatable front plate.

4. The card reader of claim 3, wherein the stationary front plate and the rotatable front plate have the same triangular surface area.

5. The card reader of claim 1, further comprising a protrusion extending from a bottom portion of the stationary back plate or the stationary front plate.

6. The card reader of claim 5, further comprising a jack extending from a second bottom portion of the stationary back plate or the stationary front plate and located on a different portion of the stationary back plate or the stationary front plate from the protrusion.

7. The card reader of claim 6, further comprising a housing extending from the second bottom portion of the stationary back plate or the stationary front plate, wherein the jack extends through the housing.

8. The card reader of claim 1, wherein the stationary back plate and the stationary front plate form a unitary structure.

9. The card reader of claim 1, further comprising:
    a protrusion extending from a first bottom portion of the stationary back plate or the stationary front plate;
    a jack extending from a second bottom portion of the stationary back plate or the stationary front plate; and a housing extending from the second bottom portion of the stationary back plate or the stationary front plate, wherein the jack extends through the housing.

10. The card reader of claim 1, wherein the card is a magnetic strip card.

11. A card reader for a mobile device, comprising:
a stationary first plate;
a stationary second plate connected to the first plate, wherein a slot is formed between the first plate and the second plate and wherein the slot is configured to receive a card;
a third plate rotatably coupled to the second plate and rotatable along a face of the stationary first or second plate parallel to a front or back face of the mobile device, wherein the third plate is rotatable to be positioned such that at least a portion of the third plate overlaps a surface of the mobile device when the card reader is inserted into the mobile device; and
a jack extending from a first bottom portion of the first or second plate.

12. The card reader of claim 11, wherein the first, second, and third plates are triangular.

13. The card reader of claim 12, wherein the stationary first plate is a triangular back plate larger than the second and third plates.

14. The card reader of claim 13, wherein the second and third plate have the same triangular surface area.

15. The card reader of claim 13, further comprising a protrusion extending from a second bottom portion of the stationary first or second plate, wherein the second bottom portion is at a different location than the first bottom portion.

16. The card reader of claim 11, wherein the stationary first and second plates form a unitary structure.

17. The card reader of claim 11, further comprising a housing extending from the first bottom portion of the first or second plate, wherein the jack extends through the housing.

18. The card reader of claim 11, further comprising:
a protrusion extending from a second bottom portion of the stationary first or second plate; and
a housing extending from the first bottom portion of the stationary first or second plate, wherein the jack extends through the housing and the second bottom portion is at a different location than the first bottom portion.

19. The card reader of claim 11, wherein the card is a magnetic strip card.

20. The card reader of claim 19, further comprising a read head along a portion of the stationary first plate.

* * * * *